(12) United States Patent
Handa (10) Patent No.: US 12,429,852 B2
(45) Date of Patent: Sep. 30, 2025

(54) HYDROGEN FILLING APPARATUS AND HYDROGEN FILLING METHOD

(71) Applicant: HONDA MOTOR CO., LTD., Tokyo (JP)

(72) Inventor: Kiyoshi Handa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 437 days.

(21) Appl. No.: 18/084,630

(22) Filed: Dec. 20, 2022

(65) Prior Publication Data

US 2023/0205183 A1     Jun. 29, 2023

(30) Foreign Application Priority Data

Dec. 24, 2021    (JP) ................................ 2021-210452

(51) Int. Cl.
    *G05B 19/416*        (2006.01)

(52) U.S. Cl.
CPC .. *G05B 19/416* (2013.01); *G05B 2219/45052* (2013.01); *G05B 2219/45076* (2013.01)

(58) Field of Classification Search
CPC ........ G05B 19/416; G05B 2219/45052; G05B 2219/45076; F17C 2223/0123; F17C 2223/036; F17C 2260/023; F17C 13/00; F17C 2221/012; F17C 2225/0123; F17C 2225/036; F17C 2250/032; F17C 2265/065; F17C 2270/0184; F17C 13/025; F17C 2250/043; F17C 2270/0168; F17C 13/12; F17C 2265/061; F17C 2260/042; F17C 2270/0139; F17C 5/06; F17C 2227/04; Y02E 60/32
See application file for complete search history.

(56) References Cited

U.S. PATENT DOCUMENTS

| | | |
|---|---|---|
| 9,749,002 B1 | 8/2017 | Fan |
| 2003/0083848 A1 | 5/2003 | Kami |

(Continued)

FOREIGN PATENT DOCUMENTS

| | | |
|---|---|---|
| CN | 102667302 A | 9/2012 |
| CN | 112204298 A | 1/2021 |

(Continued)

OTHER PUBLICATIONS

Office Action dated Jul. 23, 2024 issued in the corresponding Japanese Patent Application No. 2021-210452 with the English machine translation thereof.

(Continued)

*Primary Examiner* — Kamini S Shah
*Assistant Examiner* — Mohammed Shafayet
(74) *Attorney, Agent, or Firm* — Carrier, Shende & Associates P.C.; Fulchand P. Shende; Joseph P. Carrier (57) ABSTRACT

A hydrogen filling apparatus includes an initial pressure acquisition unit that acquires an initial pressure in a hydrogen tank, a history acquisition unit that acquires a filling history of a requesting vehicle, a determination unit that determines, based on the filling history, whether or not the hydrogen tank will overheat if the hydrogen tank is filled with hydrogen at a filling speed corresponding to the initial pressure, and a filling control unit that fills the hydrogen tank with hydrogen at a filling speed lower than the filling speed corresponding to the initial pressure, when it is determined that the hydrogen tank will overheat.

5 Claims, 6 Drawing Sheets

(56) References Cited

U.S. PATENT DOCUMENTS

| | | | | |
|---|---|---|---|---|
| 2012/0227864 | A1* | 9/2012 | Mori | F17C 5/06 |
| | | | | 141/95 |
| 2014/0202584 | A1* | 7/2014 | Mathison | F17C 5/06 |
| | | | | 141/4 |
| 2015/0308621 | A1* | 10/2015 | Mathison | F17C 5/06 |
| | | | | 141/94 |
| 2017/0074707 | A1* | 3/2017 | Mathison | G01F 22/02 |
| 2021/0062973 | A1* | 3/2021 | Fukunaga | F17C 5/007 |
| 2022/0018498 | A1 | 1/2022 | Asai et al. | |
| 2022/0403983 | A1* | 12/2022 | Hayasaka | F17C 5/007 |
| 2023/0205183 | A1 | 6/2023 | Handa | |

FOREIGN PATENT DOCUMENTS

| | | | | |
|---|---|---|---|---|
| CN | 116336377 A | | 6/2023 | |
| JP | 2003-130295 A | | 5/2003 | |
| JP | 2009257353 A | * | 11/2009 | F17C 5/06 |
| JP | 2011-153681 A | | 8/2011 | |
| JP | 2013-527390 A | | 6/2013 | |
| JP | 2016-223584 A | | 12/2016 | |
| JP | 2019-002515 A | | 1/2019 | |
| JP | 2019-102288 A | | 6/2019 | |
| WO | WO-2011092560 A1 | * | 8/2011 | F17C 5/007 |
| WO | 2011/133296 A1 | | 10/2011 | |
| WO | 2020/196668 A1 | | 10/2020 | |

OTHER PUBLICATIONS

Office Action and Search Report dated Jun. 28, 2025 issued in the corresponding Chinese Patent Application No. 202211666367.8 with the English machine translation thereof.

* cited by examiner

HYDROGEN FILLING APPARATUS AND HYDROGEN FILLING METHOD

CROSS-REFERENCE TO RELATED APPLICATIONS

This application is based upon and claims the benefit of priority from Japanese Patent Application No. 2021-210452 filed on Dec. 24, 2021, the contents of which are incorporated herein by reference.

BACKGROUND OF THE INVENTION

Field of the Invention

The present invention relates to a hydrogen filling apparatus for filling a hydrogen tank of a vehicle with hydrogen, and a hydrogen filling method executable by the hydrogen filling apparatus.

Description of the Related Art

The hydrogen filling apparatus is an apparatus that fills a hydrogen tank of a fuel cell vehicle (FCV) with hydrogen. The temperature in the hydrogen tank (tank temperature) is affected by the compression heat or the like of the hydrogen filled in the hydrogen tank, and temporarily rises during hydrogen filling.

For the tank temperature, a threshold value indicating an allowable temperature is determined. If the tank temperature exceeds this threshold value, the hydrogen tank will overheat. Therefore, the hydrogen filling apparatus is required to fill the hydrogen tank with hydrogen so that the hydrogen tank does not overheat. In this regard, a hydrogen filling apparatus disclosed in JP 2019-002515 A determines a pressure increase rate (filling speed) of hydrogen based on a residual pressure (initial pressure) of hydrogen in a hydrogen tank at the start of hydrogen filling, and an outside air temperature.

SUMMARY OF THE INVENTION

The hydrogen filling apparatus may fill the same hydrogen tank with hydrogen twice (twice or more) in a short period of time. In this case, the hydrogen tank heated in the first hydrogen filling is further heated in the second hydrogen filling.

The hydrogen filling apparatus disclosed in JP 2019-002515 A determines the filling speed of the second hydrogen filling without considering that the hydrogen tank is heated in the first hydrogen filling. Therefore, in the hydrogen filling apparatus disclosed in JP 2019-002515 A, the hydrogen tank may overheat in the second hydrogen filling.

Note that a protocol for transmitting the tank temperature from the FCV to the hydrogen filling apparatus is known. Therefore, a method for determining the filling speed based on the tank temperature transmitted from the FCV is conceivable. However, in this method, when the tank temperature transmitted from the FCV is not correct, the hydrogen tank may overheat.

An object of the present invention is to solve the aforementioned problem.

According to a first aspect of the present invention, there is provided a hydrogen filling apparatus that fills a hydrogen tank of a requesting vehicle with hydrogen, based on a filling control map indicating a filling speed of the hydrogen that corresponds to an initial pressure in the hydrogen tank, the hydrogen filling apparatus comprising: an initial pressure acquisition unit configured to acquire the initial pressure in the hydrogen tank; a history acquisition unit configured to acquire a filling history of the requesting vehicle; a determination unit configured to perform determination as to whether or not the hydrogen tank will overheat if the hydrogen tank is filled with the hydrogen at a filling speed corresponding to the initial pressure in the hydrogen tank, based on the filling history of the requesting vehicle; and a filling control unit configured to fill the hydrogen tank with the hydrogen at a filling speed lower than the filling speed corresponding to the initial pressure in the hydrogen tank, when the determination unit determines that the hydrogen tank will overheat.

According to a second aspect of the present invention, there is provided a hydrogen filling method for filling a hydrogen tank of a requesting vehicle with hydrogen, based on a filling control map indicating a filling speed of the hydrogen that corresponds to an initial pressure in the hydrogen tank, the hydrogen filling method comprising: an initial pressure acquisition step of acquiring the initial pressure in the hydrogen tank; a history acquisition step of acquiring a filling history of the requesting vehicle; a determination step of determining, based on the filling history of the requesting vehicle, whether or not the hydrogen tank will overheat if the hydrogen tank is filled with the hydrogen at a filling speed corresponding to the initial pressure in the hydrogen tank; and a filling control step of filling the hydrogen tank with the hydrogen at a filling speed lower than the filling speed corresponding to the initial pressure in the hydrogen tank, when it is determined in the determination step that the hydrogen tank will overheat.

According to the present invention, there is no possibility that the hydrogen tank will overheat due to continuous filling of hydrogen into this hydrogen tank.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Embodiment

Figure 1:
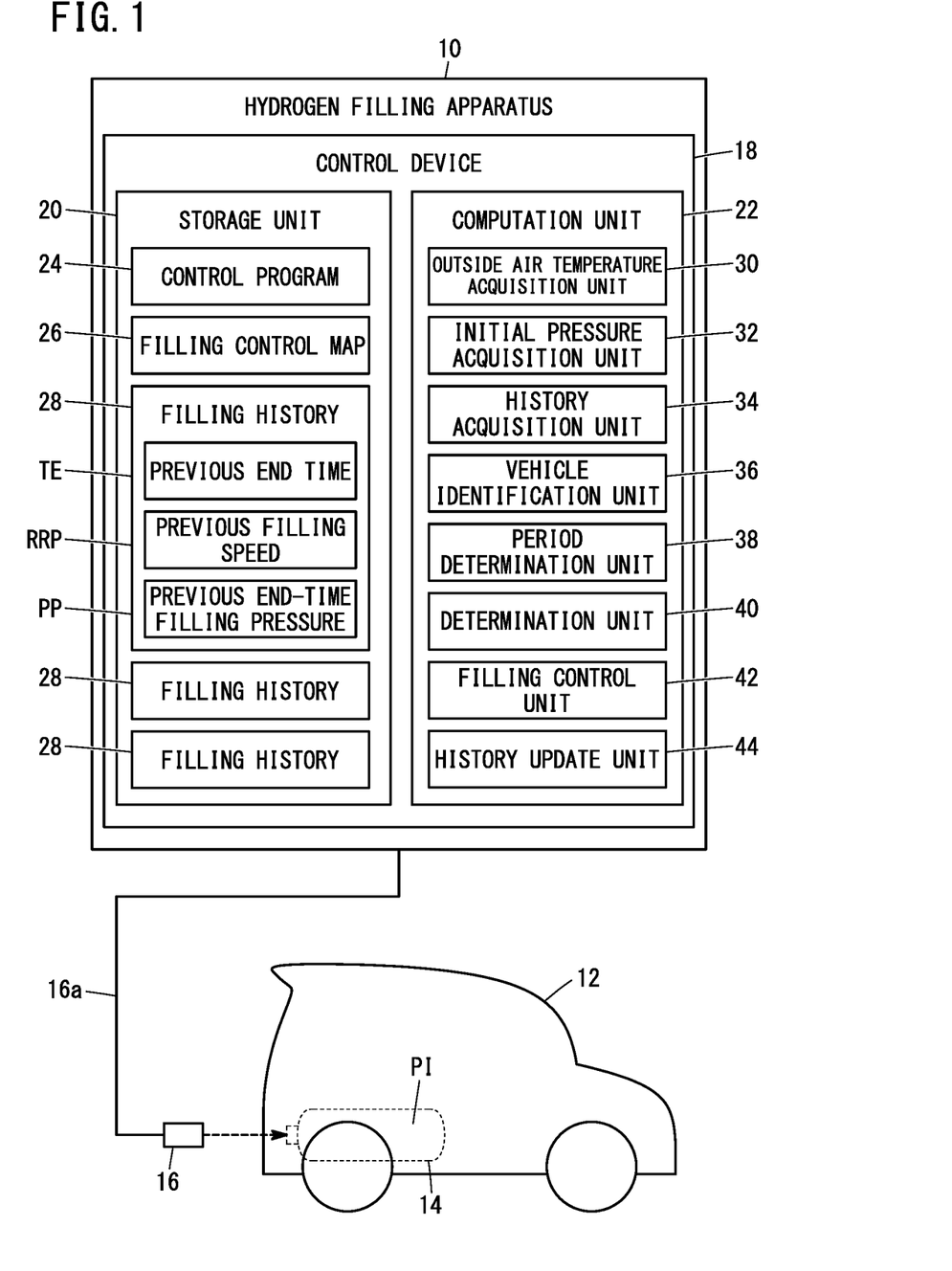
FIG. 1 is a schematic configuration diagram of a hydrogen filling apparatus according to an embodiment of the present invention.

FIG. 1 is a schematic configuration diagram of a hydrogen filling apparatus 10 according to an embodiment of the present invention.

FIG. 1 illustrates not only the hydrogen filling apparatus 10 but also a vehicle (requesting vehicle) 12 to be filled with hydrogen. The requesting vehicle 12 is an FCV. The requesting vehicle 12 includes a hydrogen tank 14.

The hydrogen filling apparatus 10 is an apparatus for filling the hydrogen tank 14 with hydrogen. The hydrogen filling apparatus 10 is installed in a hydrogen station, for example. The hydrogen station includes not only the hydrogen filling apparatus 10 but also equipment (accumulator, precooler, or the like) for compressing or precooling hydrogen before being filled into the hydrogen tank 14. However, illustration of the equipment is omitted.

The hydrogen filling apparatus 10 includes a nozzle 16 and a control device 18. The hydrogen filling apparatus 10 may include a plurality of the nozzles 16.

The nozzle 16 is connectable to the hydrogen tank 14. The hydrogen filling apparatus 10 fills the hydrogen tank 14 with pre-cooled hydrogen through the nozzle 16.

The control device 18 is an electronic device (computer) that adjusts the filling speed of hydrogen. The control device 18 includes a storage unit 20 and a computation unit 22.

The storage unit 20 includes one or more memories. The storage unit 20 stores a control program 24 and a filling control map 26.

The control program 24 is a program for causing the hydrogen filling apparatus 10 to perform the hydrogen filling method according to the present embodiment.

The filling control map 26 shows a correspondence relationship between the outside air temperature, an initial pressure PI in the hydrogen tank 14, and the filling speed of hydrogen. The filling control map 26 indicates a plurality of filling speeds corresponding to combinations of the outside air temperature and the initial pressure PI.

The storage unit 20 further stores a filling history 28. The filling history 28 includes a previous end time TE, a previous filling speed RRP, and a previous end-time filling pressure PP. The previous end time TE indicates the end time of the previous hydrogen filling of the vehicle. The previous filling speed RRP indicates the filling speed in the previous hydrogen filling of the vehicle. The previous end-time filling pressure PP indicates the filling pressure in the hydrogen tank 14 of the vehicle obtained at the end of the previous hydrogen filling.

The storage unit 20 may store a plurality of the filling histories 28. The plurality of filling histories 28 indicate information about vehicles different from each other.

The computation unit 22 includes processing circuitry. The processing circuitry includes, for example, one or more processors. The computation unit 22 includes an outside air temperature acquisition unit 30, an initial pressure acquisition unit 32, a history acquisition unit 34, a vehicle identification unit 36, a period determination unit 38, a determination unit 40, a filling control unit 42, and a history update unit 44. The outside air temperature acquisition unit 30, the initial pressure acquisition unit 32, the history acquisition unit 34, the vehicle identification unit 36, the period determination unit 38, the determination unit 40, the filling control unit 42, and the history update unit 44 are realized by the computation unit 22 executing the control program 24.

The outside air temperature acquisition unit 30 acquires an outside air temperature. The outside air temperature acquisition unit 30 acquires the outside air temperature from, for example, an air temperature sensor installed in the hydrogen station. The outside air temperature substantially indicates a tank temperature except for a time period from when the hydrogen tank 14 is heated in response to hydrogen filling to when the heat is sufficiently dissipated.

The storage unit 20 may store the outside air temperature acquired by the outside air temperature acquisition unit 30.

The initial pressure acquisition unit 32 acquires the initial pressure PI in the hydrogen tank 14. The initial pressure PI is detected by, for example, a pressure sensor. This pressure sensor is provided in, for example, the hydrogen filling apparatus 10 (a pipe 16a connected to the nozzle 16). The pressure sensor detects the initial pressure PI by detecting the pressure in the pipe 16a communicating with the hydrogen tank 14.

The storage unit 20 may store the initial pressure PI acquired by the initial pressure acquisition unit 32.

The history acquisition unit 34 acquires the filling history 28 by referring to the storage unit 20. The history acquisition unit 34 acquires the filling history 28 related to a target vehicle (previous vehicle) of the previous hydrogen filling performed by the hydrogen filling apparatus 10.

The vehicle identification unit 36 determines whether or not the previous vehicle and the requesting vehicle 12 are the same, based on the difference between the previous end-time filling pressure PP and the initial pressure PI. Here, the vehicle identification unit 36 refers, as necessary, to the filling history 28 acquired by the history acquisition unit 34.

When there is no large difference between the previous end-time filling pressure PP and the initial pressure PI (PP≈PI), there is a high possibility that the previous vehicle and the requesting vehicle 12 are the same. Based on this, when the difference between the previous end-time filling pressure PP and the initial pressure PI falls within a predetermined range, the vehicle identification unit 36 determines that the previous vehicle and the requesting vehicle 12 are the same. On the other hand, when the difference between the previous end-time filling pressure PP and the initial pressure PI deviates from the predetermined range, the vehicle identification unit 36 determines that the previous vehicle and the requesting vehicle 12 are different from each other.

The period determination unit 38 determines a length of a predetermined period TL. The period determination unit 38 of the present embodiment determines the length of the predetermined period TL when it is determined that the previous vehicle and the requesting vehicle 12 are the same. The predetermined period TL is a period required for the hydrogen tank 14 heated by the previous hydrogen filling to sufficiently dissipate the heat. The period determination unit 38 calculates the predetermined period TL that satisfies expression (1).

$$TL \geq (RRA-RRP)(PF-PI)/RRA \cdot RRP \tag{1}$$

The values indicated by the letters in expression (1) are as follows. TL is the predetermined time period. PF is a maximum filling pressure. The maximum filling pressure PF indicates a maximum filling pressure of hydrogen that can be filled into the hydrogen tank 14. Note that a method for detecting the maximum filling pressure PF is known in this technical field. RRP is the previous filling speed. The period determination unit 38 acquires the previous filling speed RRP based on the filling history 28 of the previous vehicle (=the requesting vehicle 12). PI is the initial pressure in the hydrogen tank 14. RRA is a filling speed (first filling speed) corresponding to the initial pressure PI. The period determination unit 38 acquires the first filling speed RRA based on the filling control map 26, the outside air temperature, and the initial pressure PI.

Figure 2:
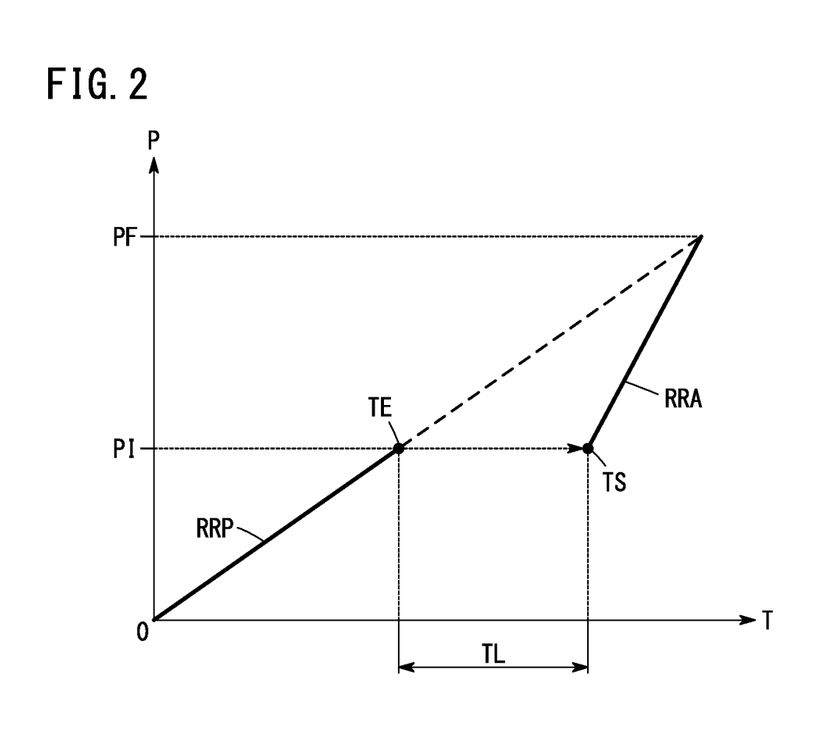
FIG. 2 is a graph for explaining expression (1)

FIG. 2 is a graph for explaining expression (1).

The graph of FIG. 2 has a vertical axis indicating a filling residual pressure (P) of hydrogen in the hydrogen tank 14, and a horizontal axis (time axis) indicating the elapse of time (T). In FIG. 2, TS indicates a start time point of the requested current hydrogen filling. In FIG. 2, 0 indicates an initial pressure in the hydrogen tank 14 in the previous hydrogen filling. However, the initial pressure in the previous hydrogen filling is not limited to 0.

The graph of FIG. 2 illustrates the predetermined time period TL that satisfies expression (1). That is, in FIG. 2, the predetermined period TL that satisfies expression (1) is present between the previous end time TE and the start time point TS. In this case, an average filling speed between the previous end time TE and an end time point (expected end time point) of the requested current hydrogen filling is equal to or less than the previous filling speed RRP. Note that the end time point of the requested current hydrogen filling is the time point at which the filling residual pressure in the hydrogen tank 14 reaches the maximum filling pressure PF.

The storage unit 20 may store the predetermined period TL calculated by the period determination unit 38.

Based on the filling history 28, the determination unit 40 determines whether or not filling the hydrogen tank 14 with hydrogen at the first filling speed RRA causes the hydrogen tank 14 to overheat.

More specifically, the determination unit 40 determines whether or not a time difference TD between the previous end time TE and a time (current time) at which filling of hydrogen into the hydrogen tank 14 is requested has reached the predetermined period TL (TD≥TL).

If the time difference TD has reached the predetermined period TL, the hydrogen tank 14 has dissipated heat to such an extent that it will not overheat even if hydrogen filling is performed at the first filling speed RRA. Based on this, in a case where filling of hydrogen into the hydrogen tank 14 is requested after the predetermined period TL has elapsed from the previous end time TE, the determination unit 40 determines that the hydrogen tank 14 will not overheat even if the hydrogen tank 14 is filled with hydrogen at the first filling speed RRA.

If the time difference TD has not reached the predetermined period TL, the hydrogen tank 14 is in a state in which the heat added in the previous hydrogen filling has not yet been completely dissipated. If the hydrogen tank 14 in this state is filled with hydrogen at the first filling speed RRA that corresponds to the outside air temperature and the initial pressure PI, the hydrogen tank 14 is highly likely to overheat. Based on this, in a case where filling of hydrogen into the hydrogen tank 14 is requested before the predetermined period TL elapses from the previous end time TE, the determination unit 40 determines that the hydrogen tank 14 will overheat if the hydrogen tank 14 is filled with hydrogen at the first filling speed RRA.

When the determination unit 40 determines that the hydrogen tank 14 will not overheat even if the hydrogen tank 14 is filled with hydrogen at the first filling speed RRA, the filling control unit 42 fills the hydrogen tank 14 with hydrogen at the first filling speed RRA. Further, the filling control unit 42 also fills the hydrogen tank 14 with hydrogen at the first filling speed RRA when it is identified that the requesting vehicle 12 is not the same as the previous vehicle.

On the other hand, when the determination unit 40 determines that the hydrogen tank 14 will overheat if the hydrogen tank 14 is filled with hydrogen at the first filling speed RRA, the filling control unit 42 fills the hydrogen tank 14 with hydrogen at a second filling speed RRB. Here, the second filling speed RRB is a filling speed lower than the first filling speed RRA that corresponds to the acquired outside air temperature and initial pressure PI (RRB<RRA).

The second filling speed RRB is determined in advance according to the first filling speed RRA. For example, from among a plurality of filling speeds included in the filling control map 26, a filling speed lower than the first filling speed RRA by a predetermined amount is determined as the second filling speed RRB.

The tank temperature during hydrogen filling is less likely to rise as the filling speed is lower. Therefore, the hydrogen filling apparatus 10 prevents overheating of the hydrogen tank 14 by performing hydrogen filling at the second filling speed RRB when there is a possibility that the hydrogen tank 14 will overheat if the hydrogen tank 14 is filled with hydrogen at the first filling speed RRA.

Further, the hydrogen filling apparatus 10 performs hydrogen filling at the second filling speed RRB, thereby reducing power consumption as compared with the case where hydrogen filling is performed at the first filling speed RRA.

In addition, as described above, when hydrogen filling is performed at the second filling speed RRB, the tank temperature is less likely to rise. Therefore, there is room for increasing the pre-cooling temperature of hydrogen. That is, the hydrogen filling apparatus 10 can reduce the power consumption of the precooler.

The history update unit 44 updates the filling history 28 of the requesting vehicle 12 based on the hydrogen filling performed by the filling control unit 42.

The hydrogen filling apparatus 10 has been described above.

Figure 3:
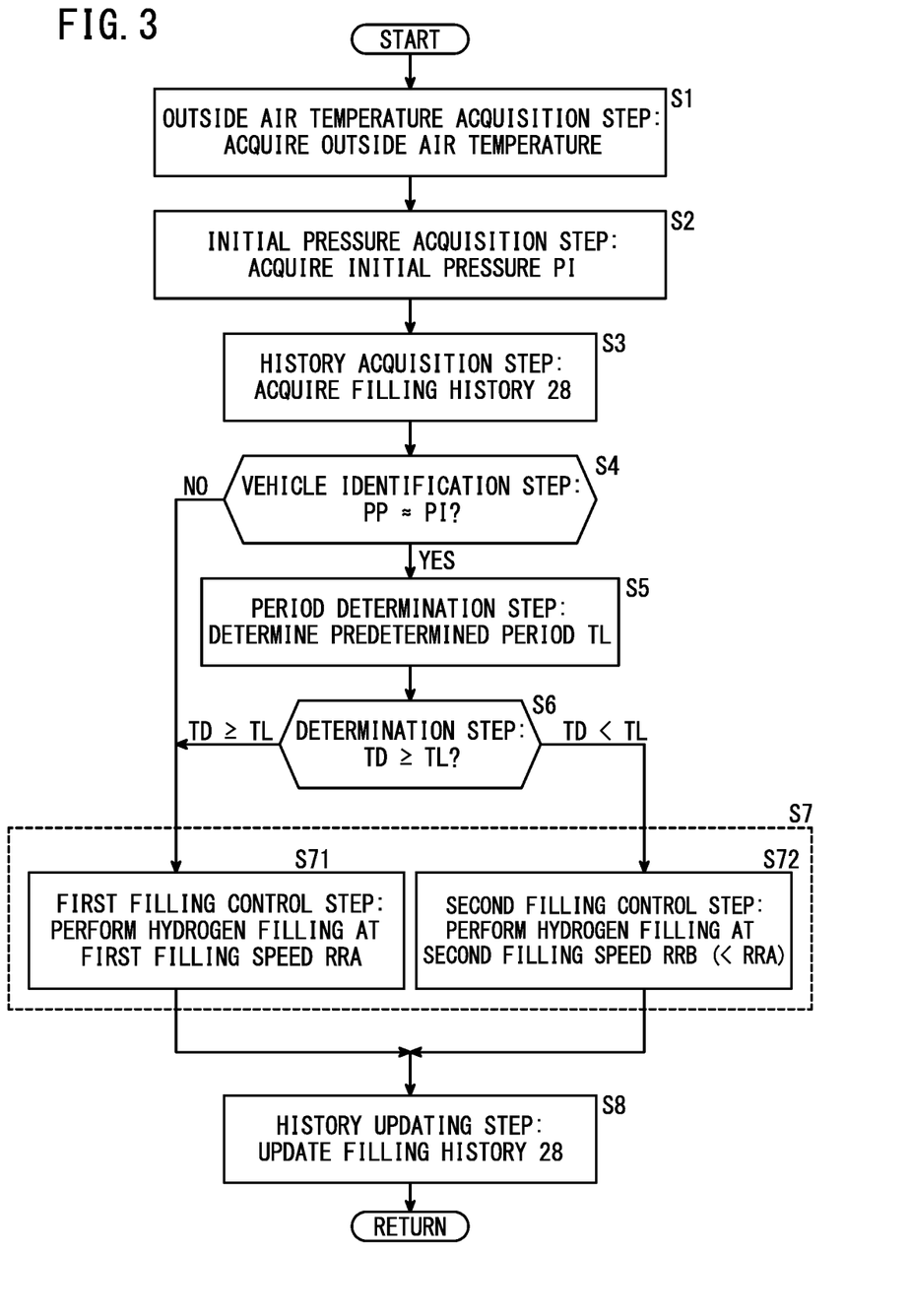
FIG. 3 is a flowchart illustrating the flow of a hydrogen filling method according to the embodiment.

FIG. 3 is a flowchart illustrating the flow of a hydrogen filling method according to the embodiment.

The hydrogen filling apparatus 10 can execute the hydrogen filling method shown in FIG. 3. The hydrogen-filling method of FIG. 3 includes an outside air temperature acquisition step S1, an initial pressure acquisition step S2, a history acquisition step S3, a vehicle identification step S4, a period determination step S5, a determination step S6, a filling control step S7, and a history updating step S8. Note that the outside air temperature acquisition step S1, the initial pressure acquisition step S2, and the history acquisition step S3 may be performed in any order.

In the outside air temperature acquisition step S1, the outside air temperature acquisition unit 30 acquires the outside air temperature.

In the initial pressure acquisition step S2, the initial pressure acquisition unit 32 acquires the initial pressure PI in the hydrogen tank 14.

In the history acquisition step S3, the history acquisition unit 34 acquires the filling history 28 of the previous car.

In the vehicle identification step S4, the vehicle identification unit 36 determines whether or not the previous vehicle and the requesting vehicle 12 are the same. When the previous vehicle and the requesting vehicle 12 are the same, the hydrogen filling apparatus 10 executes the period determination step S5 and the determination step S6 in this order. When the previous vehicle and the requesting vehicle 12 are different from each other, the hydrogen filling apparatus 10 executes a first filling control step S71 (described later).

In the period determination step S5, the period determination unit 38 determines the length of the predetermined period TL. The period determination unit 38 determines the length of the predetermined period TL based on expression (1).

In the determination step S6, the determination unit 40 determines whether or not hydrogen filling at the first filling speed RRA causes the hydrogen tank 14 to overheat. The determination unit 40 determines whether or not hydrogen filling at the first filling speed RRA causes the hydrogen tank 14 to overheat, based on the filling history 28 of the requesting vehicle 12 and the predetermined period TL. In a case where the previous vehicle and the requesting vehicle 12 are different from each other, the determination unit 40 determines that the hydrogen tank 14 will not overheat even if hydrogen filling is performed at the first filling speed RRA, regardless of the predetermined period TL.

In the filling control step S7, the filling control unit 42 controls the hydrogen filling apparatus 10 to fill the hydrogen tank 14 with hydrogen. The filling control step S7 includes the first filling control step S71 and a second filling control step S72.

When it is determined in the determination step S6 that the hydrogen tank 14 will not overheat or when the previous vehicle and the requesting vehicle 12 are different from each other, the hydrogen filling apparatus 10 executes the first filling control step S71. In the first filling control step S71, the hydrogen filling apparatus 10 fills the hydrogen tank 14 with hydrogen based on the first filling speed RRA.

When it is determined in the determination step S6 that the hydrogen tank 14 will overheat, the hydrogen filling apparatus 10 executes the second filling control step S72. In the second filling control step S72, the hydrogen filling apparatus 10 fills the hydrogen tank 14 with hydrogen based on the second filling speed RRB. As a result, even when the hydrogen tank 14 is continuously filled with hydrogen, there is no possibility that the hydrogen tank 14 will overheat.

In the history updating step S8, the history update unit 44 updates the filling history 28 of the requesting vehicle 12.

The hydrogen filling method has been described above.

MODIFICATIONS

Modifications of the above-described embodiment will be described below. However, description overlapping with that of the above embodiment will be omitted as much as possible in the following description. The reference numerals of the constituent elements described in the above embodiment denote the same constituent elements unless otherwise specified.

Modification 1

Figure 4:
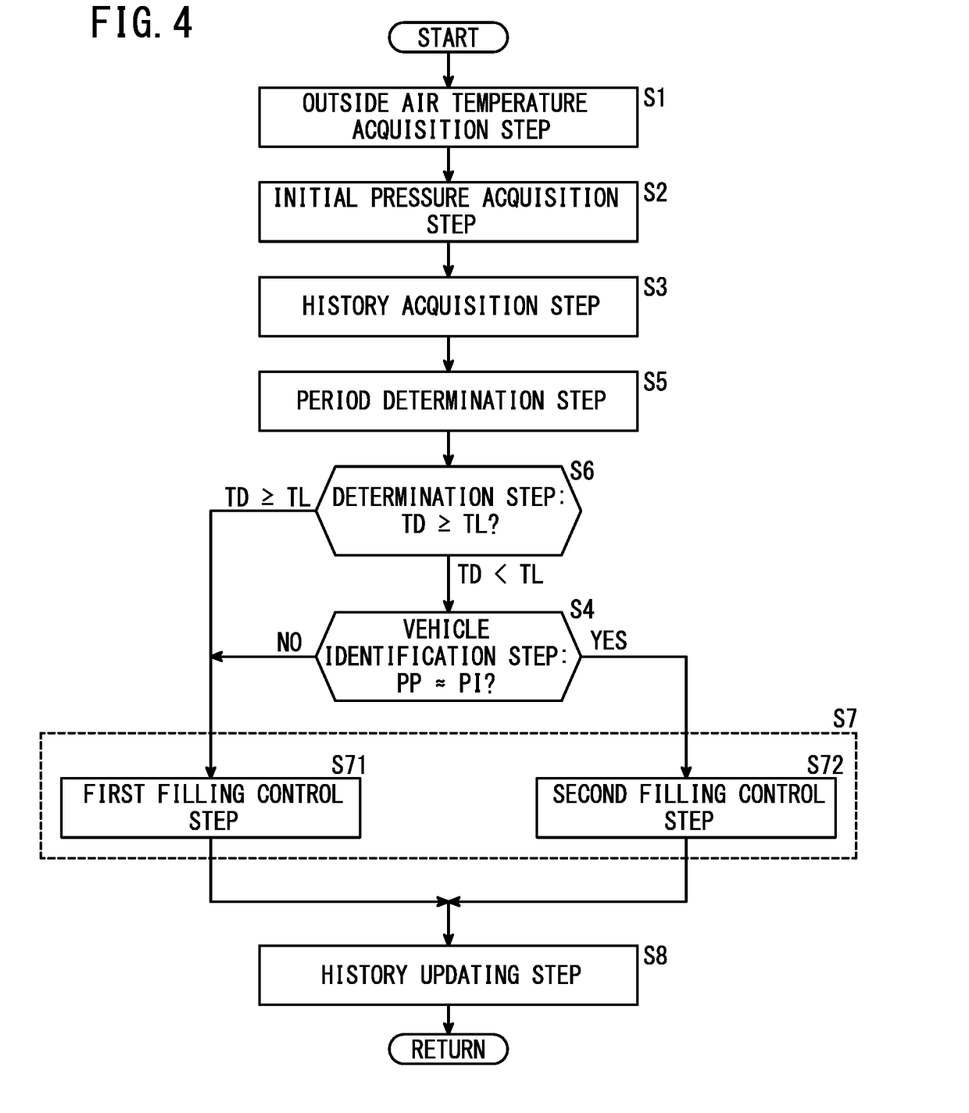
FIG. 4 is a flowchart illustrating the flow of a hydrogen filling method according to a first modification.

FIG. 4 is a flowchart illustrating the flow of a hydrogen filling method according to a first modification.

The hydrogen filling apparatus 10 may execute the hydrogen filling method of FIG. 4. In this case, the hydrogen filling apparatus 10 executes the period determination step S5 after the history acquisition step S3. Note that, in the present modification, the description of the outside air temperature acquisition step S1 to the history acquisition step S3 will be omitted.

In the period determination step S5, the period determination unit 38 determines the length of the predetermined period TL based on the filling history 28 related to the previous vehicle and expression (1).

The hydrogen filling apparatus 10 executes the determination step S6 after the period determination step S5 (see FIG. 4). In this instance, if the time difference TD has reached the predetermined period TL, the hydrogen filling apparatus 10 executes the first filling control step S71. If the time difference TD has not reached the predetermined period TL, the hydrogen filling apparatus 10 executes the vehicle identification step S4.

In the vehicle identification step S4, the hydrogen filling apparatus 10 determines whether or not the requesting vehicle 12 and the previous vehicle are the same. In this instance, if the requesting vehicle 12 and the previous vehicle are different from each other, the hydrogen filling apparatus 10 executes the first filling control step S71. On the other hand, if the requesting vehicle 12 and the previous vehicle are the same, the hydrogen filling apparatus 10 executes the second filling control step S72. As a result, according to the hydrogen filling apparatus 10, there is no possibility that the hydrogen tank 14 will overheat in the same manner as in the embodiment.

Modification 2

Figure 5:
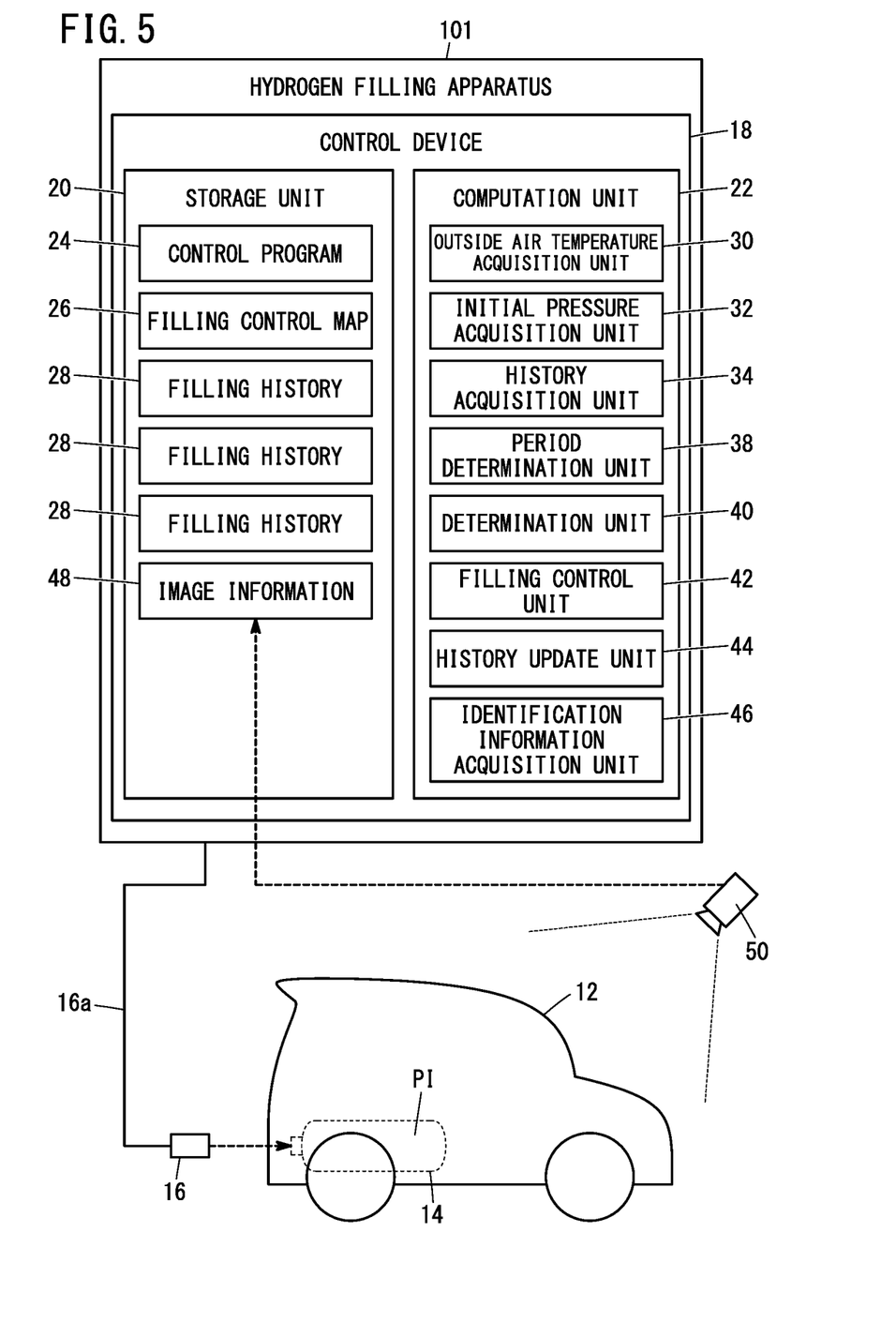
FIG. 5 is a schematic configuration diagram of a hydrogen filling apparatus according to a second modification.

FIG. 5 is a schematic configuration diagram of a hydrogen filling apparatus 101 according to a second modification.

The hydrogen filling apparatus 101 includes an identification information acquisition unit 46. The identification information acquisition unit 46 is realized by, for example, the computation unit 22 executing the control program 24.

The identification information acquisition unit 46 acquires identification information by, for example, communicating with the requesting vehicle 12. The identification information is, for example, a vehicle registration number. However, the identification information is not limited to the vehicle registration number as long as the requesting vehicle 12 can be distinguished from another vehicle.

The identification information acquisition unit 46 may acquire the identification information by analyzing image information 48 obtained by capturing the requesting vehicle 12. For example, the identification information acquisition unit 46 may recognize the vehicle registration number displayed on a license plate of the requesting vehicle 12 by analyzing the image information 48. The image information 48 is acquired by, for example, an imaging device 50 installed in the hydrogen station.

The history acquisition unit 34 refers to the storage unit 20 based on the identification information of the requesting vehicle 12. Thus, the history acquisition unit 34 acquires the filling history 28 of the requesting vehicle 12.

Figure 6:
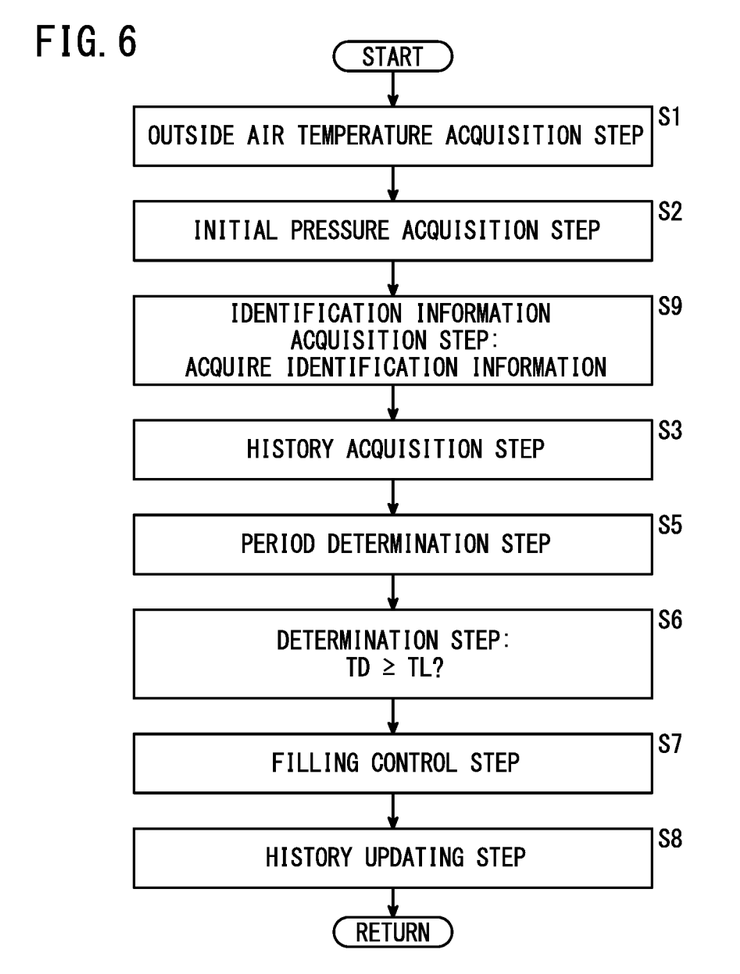
FIG. 6 is a flowchart illustrating the flow of a hydrogen filling method according to the second modification.

FIG. 6 is a flowchart illustrating the flow of a hydrogen filling method according to the second modification.

The hydrogen filling apparatus 101 can execute, for example, the hydrogen filling method shown in FIG. 6. The hydrogen filling method of FIG. 6 includes the outside air temperature acquisition step S1, the initial pressure acquisition step S2, an identification information acquisition step S9, the history acquisition step S3, the period determination step S5, the determination step S6, the filling control step S7, and the history updating step S8. Note that the outside air temperature acquisition step S1, the initial pressure acquisition step S2, and the identification information acquisition step S9 may be performed in any order.

The hydrogen filling apparatus 101 executes the identification information acquisition step S9 before the history acquisition step S3. In the identification information acquisition step S9, the identification information acquisition unit 46 acquires the identification information of the requesting vehicle 12. Thus, in the history acquisition step S3, the history acquisition unit 34 can acquire the filling history 28 of the requesting vehicle 12 based on the identification information.

After the history acquisition step S3, the hydrogen filling apparatus 101 executes the period determination step S5, the determination step S6, the filling control step S7, and the history updating step S8 in this order. In the period determination step S5, the period determination unit 38 determines the length of the predetermined period TL based on the filling history 28 acquired based on the identification information. The description of the determination step S6, the filling control step S7, and the history updating step S8 will be omitted (see the embodiment).

According to the present modification, the hydrogen filling apparatus 101 may not include the vehicle identification unit 36 (see FIG. 1). Further, the hydrogen filling method may not include the vehicle identification step S4 (see FIG. 3).

Modification 3

The predetermined period TL may be a period determined in advance. In this case, the storage unit 20 may store the predetermined period TL determined in advance. The predetermined period TL may be determined in advance in accordance with, for example, the vehicle type of the vehicle, the type of the hydrogen tank 14, or the capacity of the hydrogen tank 14.

The storage unit 20 may store a plurality of the predetermined periods TL determined in advance. In this case, the plurality of predetermined periods TL may be tabulated. For example, a plurality of predetermined periods TL corresponding to the maximum filling pressure PF, the previous filling speed RRP, the initial pressure PI, and the first filling speed RRA may be tabulated. In this case, the determination unit 40 may acquire the predetermined period TL corresponding to the maximum filling pressure PF, the previous filling speed RRP, the initial pressure PI, and the first filling speed RRA by referring to the table.

According to the present modification, the hydrogen filling apparatus 10 may not include the period determination unit 38.

Modification 4

An external storage device (external storage unit) may be installed at a location away from the hydrogen filling apparatus 10. The external storage device is, for example, a server device. Alternatively, the external storage device may be, for example, a storage unit (20) of a hydrogen filling apparatus (10) different from the hydrogen filling apparatus 10.

The external storage device may store, for example, the filling histories 28 of a plurality of vehicles. The history acquisition unit 34 may acquire the filling history 28 by accessing the external storage device.

The present invention is not limited to the above disclosure, and various modifications are possible without departing from the essence and gist of the present invention.

Invention Obtainable from Embodiment

The invention that can be grasped from the above-described embodiment and modifications will be described below.
<First Invention>

The first invention is the hydrogen filling apparatus (10, 101) that fills the hydrogen tank (14) of the requesting vehicle (12) with hydrogen based on the filling control map (26) indicating the filling speed of the hydrogen that corresponds to the initial pressure (PI) in the hydrogen tank, the hydrogen filling apparatus including: the initial pressure acquisition unit (32) that acquires the initial pressure in the hydrogen tank; the history acquisition unit (34) that acquires the filling history (28) of the requesting vehicle; the determination unit (40) that determines, based on the filling history of the requesting vehicle, whether or not the hydrogen tank will overheat if the hydrogen tank is filled with the hydrogen at the filling speed (RRA) corresponding to the initial pressure in the hydrogen tank; and the filling control unit (42) that fills the hydrogen tank with the hydrogen at the filling speed (RRB) lower than the filling speed corresponding to the initial pressure in the hydrogen tank, when the determination unit determines that the hydrogen tank will overheat.

As a result, there is no possibility that the hydrogen tank will overheat due to continuous filling of hydrogen into this hydrogen tank.

The filling history may include the end time (TE) of the previous hydrogen filling of the requesting vehicle, and the determination unit may determine that the hydrogen tank will overheat if filling of the hydrogen into the hydrogen tank is requested before the predetermined period (TL) elapses from the end time. As a result, if the hydrogen tank does not sufficiently dissipate heat, the hydrogen filling apparatus can avoid hydrogen filling at the filling speed corresponding to the initial pressure in the hydrogen tank.

The filling history may include the filling speed (RRP) in the previous hydrogen filling of the requesting vehicle, and the hydrogen filling apparatus may further include the period determination unit (38) that determines the length of the predetermined period based on the filling speed in the previous hydrogen filling of the requesting vehicle, the filling speed corresponding to the initial pressure in the hydrogen tank, and the maximum filling pressure (PF) of the hydrogen that can be filled into the hydrogen tank. As a result, the hydrogen filling apparatus can derive the predetermined period required for the hydrogen tank to sufficiently dissipate heat.

The filling history may include the previous end-time filling pressure (PP) in the hydrogen tank obtained at the end of the previous hydrogen filling, and when the difference between the previous end-time filling pressure and the initial pressure in the hydrogen tank deviates from the predetermined range, the filling control unit may fill the hydrogen tank with the hydrogen at the filling speed corresponding to the initial pressure in the hydrogen tank, regardless of the determination result of the determination unit. As a result, the hydrogen filling apparatus can fill the hydrogen into the requesting vehicle different from the previous vehicle, at the filling speed corresponding to the initial pressure in the hydrogen tank.

The hydrogen filling apparatus (101) may further include the identification information acquisition unit (46) that acquires the identification information of the requesting vehicle, and the history acquisition unit may refer to the storage unit (20) storing the filling histories of the plurality of vehicles, to acquire the filling history of the requesting vehicle based on the identification information. As a result, the hydrogen filling apparatus can distinguish between the requesting vehicle and a different vehicle.

The identification information acquisition unit may acquire the identification information by analyzing the image information (48) obtained by capturing the requesting vehicle. As a result, the hydrogen filling apparatus can distinguish between the requesting vehicle and a different vehicle.
<Second Invention>

The second invention is the hydrogen filling method for filling the hydrogen tank (14) of the requesting vehicle (12) with hydrogen based on the filling control map (26) indicating the filling speed of the hydrogen that corresponds to the initial pressure (PI) in the hydrogen tank, the hydrogen filling method including: the initial pressure acquisition step (S2) of acquiring the initial pressure in the hydrogen tank; the history acquisition step (S3) of acquiring the filling history (28) of the requesting vehicle; the determination step (S6) of determining, based on the filling history of the requesting vehicle, whether or not the hydrogen tank will overheat if the hydrogen tank is filled with the hydrogen at the filling speed (RRA) corresponding to the initial pressure in the hydrogen tank; and the filling control step (S7) of filling the hydrogen tank with the hydrogen at the filling speed (RRB) lower than the filling speed corresponding to the initial pressure in the hydrogen tank, when it is determined in the determination step that the hydrogen tank will overheat.

As a result, there is no possibility that the hydrogen tank will overheat due to continuous filling of hydrogen into this hydrogen tank.

What is claimed is:

1. A hydrogen filling apparatus that fills a hydrogen tank of a requesting vehicle with hydrogen, based on a filling control map indicating a filling speed of the hydrogen that corresponds to an initial pressure in the hydrogen tank, the hydrogen filling apparatus comprising one or more processors that execute computer-executable instructions stored in a storage unit, wherein
the one or more processors execute the computer-executable instructions to cause the hydrogen filling apparatus to:
acquire the initial pressure in the hydrogen tank;
acquire a filling history of the requesting vehicle;
perform determination as to whether or not the hydrogen tank will overheat if the hydrogen tank is filled with the hydrogen at a filling speed corresponding to the initial pressure in the hydrogen tank, based on the filling history of the requesting vehicle; and
fill the hydrogen tank with the hydrogen at a filling speed lower than the filling speed corresponding to the initial pressure in the hydrogen tank, when it is determined that the hydrogen tank will overheat,
wherein
the filling history includes an end time of previous hydrogen filling of the requesting vehicle and a filling speed in the previous hydrogen filling of the requesting vehicle,
the one or more processors further cause the hydrogen filling apparatus to
determine a length of a predetermined period based on the filling speed in the previous hydrogen filling of the requesting vehicle, the filling speed corresponding to the initial pressure in the hydrogen tank, and a maximum filling pressure of the hydrogen that is allowed to be filled into the hydrogen tank, wherein the predetermined period is a predicted heat dissipation period of the hydrogen tank a temperature of which has risen due to the previous hydrogen filling of the requesting vehicle, and
determine that the hydrogen tank will overheat if filling of the hydrogen into the hydrogen tank is requested before the predetermined period elapses from the end time.

2. The hydrogen filling apparatus according to claim 1, wherein
the filling history includes a previous end-time filling pressure in the hydrogen tank obtained at an end of the previous hydrogen filling, and
when a difference between the previous end-time filling pressure and the initial pressure in the hydrogen tank deviates from a predetermined range, the one or more processors cause the hydrogen filling apparatus to fill the hydrogen tank with the hydrogen at the filling speed corresponding to the initial pressure in the hydrogen tank, regardless of a result of the determination as to whether or not the hydrogen tank will overheat.

3. The hydrogen filling apparatus according to claim 1, wherein
the one or more processors further cause the hydrogen filling apparatus to:
acquire identification information of the requesting vehicle; and
refer to the storage unit in which filling histories of a plurality of vehicles are stored, to acquire the filling history of the requesting vehicle based on the identification information.

4. The hydrogen filling apparatus according to claim 3, wherein
the one or more processors further cause the hydrogen filling apparatus to acquire the identification information by analyzing image information obtained by capturing the requesting vehicle.

5. A hydrogen filling method for filling a hydrogen tank of a requesting vehicle with hydrogen, based on a filling control map indicating a filling speed of the hydrogen that corresponds to an initial pressure in the hydrogen tank, the hydrogen filling method comprising:
acquiring the initial pressure in the hydrogen tank;
acquiring a filling history of the requesting vehicle;
determining, based on the filling history of the requesting vehicle, whether or not the hydrogen tank will overheat if the hydrogen tank is filled with the hydrogen at a filling speed corresponding to the initial pressure in the hydrogen tank;
filling the hydrogen tank with the hydrogen at a filling speed lower than the filling speed corresponding to the initial pressure in the hydrogen tank, when it is determined that the hydrogen tank will overheat,
wherein the filling history includes an end time of previous hydrogen filling of the requesting vehicle and a filling speed in the previous hydrogen filling of the requesting vehicle;
determining a length of a predetermined period based on the filling speed in the previous hydrogen filling of the requesting vehicle, the filling speed corresponding to the initial pressure in the hydrogen tank, and a maximum filling pressure of the hydrogen that is allowed to be filled into the hydrogen tank, wherein the predetermined period is a predicted heat dissipation period of the hydrogen tank a temperature of which has risen due to the previous hydrogen filling of the requesting vehicle; and
determining that the hydrogen tank will overheat if filling of the hydrogen into the hydrogen tank is requested before the predetermined period elapses from the end time.

* * * * *